(12) United States Patent
MacArthur

(10) Patent No.: US 12,312,644 B2
(45) Date of Patent: May 27, 2025

(54) METHOD AND APPARATUS FOR REMOTE CONTROL AND MONITORING OF HEAT-TREATMENT EQUIPMENT

(71) Applicant: SUPERHEAT FGH TECHNOLOGIES INC., Kincardine (CA)

(72) Inventor: David Norman MacArthur, London (CA)

(73) Assignee: SUPERHEAT FGH TECHNOLOGIES INC., Kincardine (CA)

(*) Notice: Subject to any disclaimer, the term of this patent is extended or adjusted under 35 U.S.C. 154(b) by 804 days.

(21) Appl. No.: 17/427,493

(22) PCT Filed: Feb. 4, 2020

(86) PCT No.: PCT/CA2020/000009
§ 371 (c)(1),
(2) Date: Jul. 30, 2021

(87) PCT Pub. No.: WO2020/160637
PCT Pub. Date: Aug. 13, 2020

(65) Prior Publication Data
US 2022/0127693 A1    Apr. 28, 2022

(51) Int. Cl.
| | | |
|---|---|---|
| *C21D 11/00* | (2006.01) | |
| *C21D 9/50* | (2006.01) | |
| *G01K 1/02* | (2021.01) | |
| *G01K 1/024* | (2021.01) | |
| *G01K 7/02* | (2021.01) | |
| *G05D 23/22* | (2006.01) | |
| *H05B 1/02* | (2006.01) | |

(52) U.S. Cl.
CPC .............. *C21D 11/00* (2013.01); *C21D 9/50* (2013.01); *G01K 1/024* (2013.01); *G01K 1/026* (2013.01); *G01K 7/02* (2013.01); *G05D 23/22* (2013.01); *H05B 1/023* (2013.01)

(58) Field of Classification Search
CPC .......... C21D 11/00; C21D 9/50; G01K 1/024; G01K 1/026; G01K 7/02; G05D 23/22; H05B 1/023; G05B 19/042
USPC ....... 266/99, 78, 87, 100; 148/508, 195, 196
See application file for complete search history.

(56) References Cited

U.S. PATENT DOCUMENTS

| | | |
|---|---|---|
| 5,185,513 A | 2/1993 | Pacileo |
| 5,708,253 A | 1/1998 | Bloch et al. |
| 7,431,780 B2 | 10/2008 | Myhr et al. |
| 8,124,003 B2 * | 2/2012 | MacArthur ............ C21D 11/00 266/78 |
| 8,361,252 B2 | 1/2013 | MacArthur et al. |
| 9,756,456 B2 | 9/2017 | Dina et al. |
| 11,426,814 B2 * | 8/2022 | Denis .................... B23K 9/173 |

(Continued)

*Primary Examiner* — Jessee R Roe
*Assistant Examiner* — Michael Aboagye
(74) *Attorney, Agent, or Firm* — Miller Thomson LLP; David J. Schnurr

(57) ABSTRACT

A remote control and monitoring apparatus for heat-treatment equipment, including heating elements installed on a workpiece at a work site to perform a heat-treatment operation, has a data acquisition and control unit, a heat-treatment unit, a communication bridge, and a control center, to permit the heat-treatment equipment installed at the work site to be controlled and monitored at a distant control facility.

9 Claims, 4 Drawing Sheets

(56) References Cited

U.S. PATENT DOCUMENTS

2002/0156542 A1 10/2002 Nandi
2014/0175084 A1* 6/2014 Ji ............................. C21D 1/76
219/393

* cited by examiner

METHOD AND APPARATUS FOR REMOTE CONTROL AND MONITORING OF HEAT-TREATMENT EQUIPMENT

FIELD OF THE INVENTION

The present invention relates to methods and apparatuses for remote control and monitoring, in particular, methods and apparatuses for remote control and monitoring of heat-treatment equipment.

BACKGROUND

Heat-treatment operations are used in a wide variety of applications to improve the mechanical and metallurgical properties of treated articles. Post weld heat-treatment is a kind of heat-treatment operation, involving the controlled heating of a material that has been welded. The primary purpose of post weld heat-treatment is to relieve residual stress formed during the welding process. Certain industries, such as the petrochemical and nuclear industries, often require mandatory performance of post weld heat-treatment to ensure safety and optimal mechanical and metallurgical performance of important pieces of equipment.

The required temperatures and times for a post weld heat-treatment operation vary with the chemical makeup and thickness of the welded material. Various safety standards and codes have developed specifications and parameters for heat-treatment operations, based on these variables as well as the intended application for the welded article. Heat-treatment operations must be conducted up to these specifications and parameters or operating with the welded article may exceed design stresses, resulting in a failure. This can cause serious injury to workers, damage to equipment, and result in costly maintenance and downtime. Additionally, welded articles, such as welded lengths of pipe are often used to convey chemicals, such as oil and gas. Improper heat-treatment of pipe welds can result in a failure, causing a leak and significant environmental damage.

Accordingly there is a need for reliable methods and apparatuses for the control and monitoring of heat-treatment operations.

SUMMARY OF THE INVENTION

A remote control and monitoring apparatus, according to the present invention, for heat-treatment equipment, including heating elements installed on a workpiece at a work site to perform a heat-treatment operation, has a data acquisition and control unit, a heat-treatment unit, a communication bridge, and a control center. The data acquisition and control unit has a plurality of thermocouples attached to the workpiece to monitor the temperature of the workpiece and is in communication with the heat-treatment unit. The heat-treatment unit has a power supply and a computer processor, configured with instructions and parameters specific to the heat-treatment operation, and receives, stores, and processes the temperature of the workpiece from the data acquisition and control unit and controls the power to the heating elements according to the instructions in order to maintain the temperature of the workpiece within the parameters. The communication bridge is in communication with the heat-treatment unit and the control center The control center has a computer processor, configured with the instructions and the parameters, and receives, stores, and processes the temperature of the workpiece.

In another embodiment, a method of remote control and monitoring of heat-treatment equipment, including heating elements installed on a workpiece at a work site to perform a heat-treatment operation, according to the present invention, has the following steps. Installing a communication bridge and a heat-treatment unit at the work site and connecting the communication bridge and heat-treatment unit via a local communication network at the work site. Connecting the heating elements with the heat-treatment unit. Installing a data acquisition and control unit adjacent the workpiece having a plurality of thermocouples attached to the workpiece for monitoring the temperature of the workpiece. Connecting the data acquisition and control unit with the heat-treatment unit to transmit the temperature of the workpiece to the heat-treatment unit. Connecting the communication bridge with a control center via a second communication network. Transmitting instructions and parameters specific to the heat-treatment operation from the control center to the heat-treatment unit, via the communication bridge. Transmitting the temperature of the workpiece from the data acquisition and control unit to the heat-treatment unit and the control center. Receiving, storing, and processing the temperature of the workpiece by the heat-treatment unit and the control center. Controlling the heating elements by the heat-treatment unit according to the instructions to maintain the temperature of the workpiece within the parameters.

In another embodiment, the method includes the steps of starting up the heat-treatment equipment in a lockout mode. Receiving a first signal at the data acquisition and control unit to release the lockout and transmitting the signal to the control center. Transmitting a second signal from the control center to the heat-treatment unit to begin the heat-treatment operation.

BRIEF DESCRIPTION OF THE DRAWINGS

In order that the invention may be more clearly understood, a preferred embodiment thereof will now be described in detail by way of example, with reference to the accompanying drawings, in which.

DESCRIPTION OF THE INVENTION

The methods and apparatuses for remote control and monitoring of heat-treatment equipment, according to the present invention, permit heat-treatment equipment installed at a work site to be controlled and monitored at a distant control facility, by way of wireless communication with an on-site communication bridge. The communication bridge is located at a work site and communicates with at least one heat-treatment unit and data acquisition and control (DAC) unit installed adjacent a workpiece, via a local communication network. The heat-treatment unit controls one or more heating elements installed on the workpiece and monitors the temperature of the workpiece, via the DAC unit. The heat-treatment unit communicates with the control center, via the communication bridge over a second communication network, to selectively engage the heating elements to carry out the heat-treatment operation with pre-set temperature instructions and parameters for the particular heat-treatment operation, for example as specified by customer documentation. The heat-treatment unit also gathers the temperature information from the workpiece, via the DAC unit, and transmits it to the control center, via the communication bridge.

Figure 1:
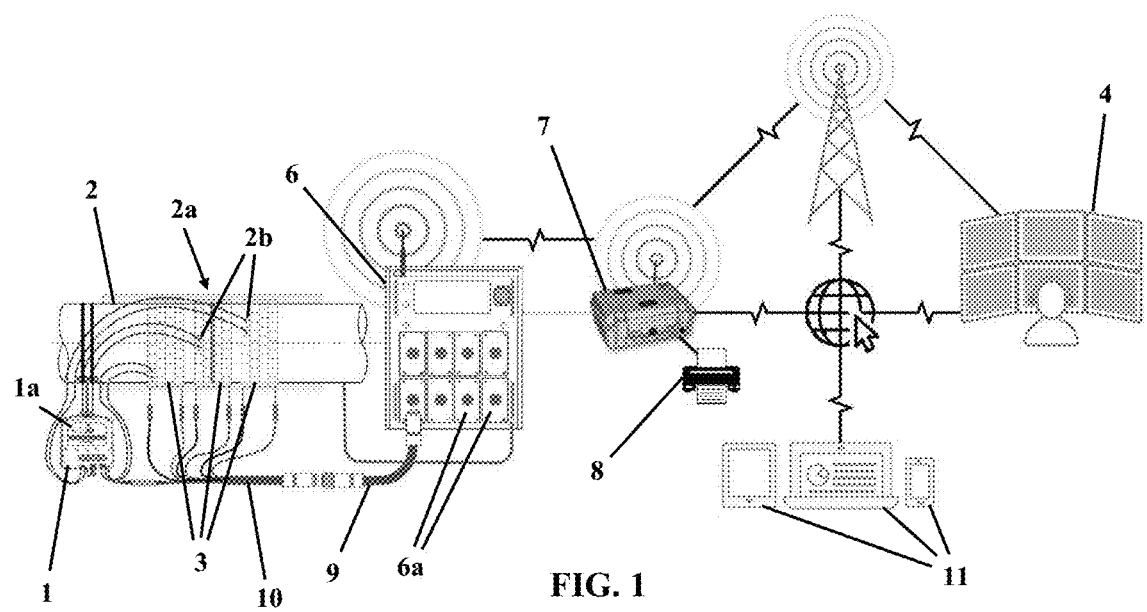
FIG. 1 is a schematic diagram, showing the communication between the various components of a remote control and monitoring apparatus, according to the present invention.

As shown in FIG. 1, the DAC unit 1 is an electronic device that is mounted adjacent to the workpiece 2 for displaying information, including alarm conditions, relating to one or more heating elements 3 attached to the workpiece 2 and monitoring the temperature of the workpiece 2. The DAC unit 1 has a plurality of thermocouples 2b that monitor the temperature of the workpiece 2 at a plurality of locations on the workpiece 2. Preferably, each DAC unit 1 has six high-temperature type K thermocouples 2b that are spot-welded to the workpiece 2 adjacent to the weld location 2 a, as required by applicable safety standards. The thermocouples 2b produce a voltage, which varies depending on the temperature of the workpiece 2, that is monitored by the DAC unit 1 and converted into a temperature reading. The proximity of the DAC unit 1 to the workpiece 2 reduces the amount of expensive thermocouple wiring required, by converting the workpiece temperature data received from the thermocouples 2b to digital format, which can be transmitted wirelessly or via other wired connections.

The DAC unit 1 also has a visual display that provides information to field personnel. The visual display includes a coloured light that illuminates in a particular flashing pattern and with a particular colour to indicate the status of the DAC unit 1, the workpiece 2, or the weld operation. For example, the coloured light may illuminate as follows: (i) no light—indicating the power is off to the weld; (ii) slow blinking—indicating temperature is either increasing up to specification or cooling down; (iii) solid light—indicating the temperature is within specifications; or (iv) rapid blinking—indicating an alarm condition. The visual display also includes a screen that provides real-time temperature information to field personnel.

The housing of the DAC unit 1 is designed to protect the internal electronic components of the DAC unit 1 from the temperature, dust, water, and other environmental hazards near the workpiece 2. The external power, communication, and thermocouple inputs are isolated from the internal components of the DAC unit 1. Drainage holes may be provided on any connection points to prevent water buildup.

The DAC unit 1 also has a card-reader system 1a for reading an integrated circuit card, or chip card 5, used by field personnel. Preferably, a radio frequency identification (RFID) card-reader system is used to read a RFID tag in the chip card 5, but other suitable card-reader systems may be used in addition to or in place of a RFID card-reader. It is preferable for the card-reader system 1a to have a limited range, so that it is only engaged when field personnel are in the immediate vicinity of the DAC unit 1, for example, when field personnel are about to release a safety lockout and start a weld operation. This minimizes the possibility of field personnel inadvertently engaging the DAC unit 1.

The card-reader system 1a permits field personnel to quickly and easily engage the DAC unit 1, using a chip card 5, to initiate or release a lockout of the heating elements 3 on a particular workpiece 2. The lockout helps to ensure the safety of the field personnel when working on the workpiece 2. Preferably, the field personnel initiate the lockout by tapping, waving, swiping, scanning, or otherwise engaging the chip card 5 with the card-reader system 1a. The DAC unit 1 then ensures that the heating elements 3 on the workpiece 2 are de-energized and are not re-energized until the field personnel initiate a release of the lockout by again engaging the chip card 5 with the card-reader system 1a. The control center 4 is then able to release the lockout on the heat-treatment operation after receiving the release signal from the DAC unit 1.

The chip card 5 may also store information relevant to the field personnel that may be read by the DAC unit 1 when the chip card 5 is engaged with the card-reader. For example, the chip card 5 may contain identifying information about a particular individual to whom the chip card 5 is issued, such as the name, position, qualifications, or contact particulars of the individual. The DAC unit 1 is thereby able to identify the individual who initiated a particular lockout and provide that information to the control center 4, along with the location, time, date, and other information about the workpiece 2 and/or the weld operation. The chip card 5 and DAC unit 1 may also be used to log proximity of field personnel and time worked at a particular workpiece 2, thereby facilitating a clock-in/clock-out procedure.

Each DAC unit 1 is connected to a heat-treatment unit 6, which has a computer processor and non-volatile memory for collecting, recording, and processing the temperature data from the DAC units 1 installed at nearby workpieces 2. The heat-treatment unit 6 also has a wired and wireless transceiver module for communication with the communication bridge 7.

Each heat-treatment unit 6 may be connected with a plurality of DAC units 1. Further, a plurality of heat-treatment units 6 may be connected with each other and positioned throughout the work site. The heat-treatment units 6 store the temperature data in memory locally and also transmit the data they collect to the control center 4, via a communication bridge 7 at the work site. The heat-treatment units 6 communicate via the local communication network, which may be a secure wired connection and/or a secure wireless network at the work site.

The heat-treatment units 6 store instructions and parameters, including temperature profiles and alarm parameters, specified for the particular heat-treatment operation being carried out at the work site, and compare the temperature data with the alarm parameters in real-time. If any of the temperature readings exceed the alarm parameters, the heat-treatment unit 6 may send an alert to the control center 4, via the communication bridge 7, and/or to the DAC unit 1. The heat-treatment units 6 alarm parameters may include over/under temperature condition, open/shorted thermocouple, heater failure, and temperature deviation. In response to an alarm condition, the heat-treatment unit 6 may automatically initiate a hold or a shutdown, illuminate the light on the DAC unit 1, power share, power limit, and provide information, notifications, and alerts via monitoring software.

The heat-treatment unit 6 is also connected to a power source, such as a suitable 3-phase electrical power supply or a generator. The heat-treatment unit 6 provides and controls power to a plurality of heating elements 3 on nearby workpieces 2 according to the stored instructions to maintain the temperature of the workpiece within the stored parameters. For example, the heat-treatment unit 6 may provide and control power to up to eight nearby workpieces 2 through a serviceable modular output connector 6a. The modular output connector 6a is connected to a secondary cable 9 providing power and data cables to a splitter 10, which break out to a DAC unit 1 and heating elements 3. The heat-treatment unit 6 uses temperature readings from the DAC unit 1 to control the electric power to the heating elements 3 in order to keep the workpiece 2 within the acceptable range of temperatures set out in the temperature profile for the particular heat-treatment operation. During the heat-treatment operation the heat-treatment unit 6 provides power limiting options to heating elements 3 to reduce load on electrical supply and also increase the longevity of the heating elements 3, while keeping the temperature profile within the specified parameters. For example, if an undersized power source is used, the heat-treatment operation will continue normally without overloading the power source by using power limiting options. Additionally, industry standard heating mats typically run at 80V in North America and 60V in the rest of the world. If non-standard heating mats are used, the heat-treatment unit 6 limits the output power delivery to individual mats, permitting better matching of heating mat size to the workpiece 2.

A communication bridge 7 has a computer processor, non-volatile memory, and a wired and wireless transceiver module, including a cellular router, for communication with all of the on-site heat-treatment units 6 and the control center 4. The communication bridge 7 may be connected with any or all of the heat-treatment units 6 either wirelessly or via a wired connection, or a combination of both types of connections. The communication bridge 7 communicates with the control center 4 to relay information from the heat-treatment units 6 to the control center 4 and relay commands from the control center 4 to the heat-treatment units 6. The transceiver module of the communication bridge 7 may be capable of wirelessly communicating by any suitable type of wireless communication, such as Spread Spectrum, 802.11x, 802.15, Bluetooth, or LTEx, or may be connected to a wired communication network, such as a fiber-optic network, a coaxial network, or a twisted pair network.

The communication bridge 7 collects temperature data from all of the heat-treatment units 6 at the work site and stores the data in memory. The communication bridge 7 also functions as a communications gateway between the heat-treatment units 6 and the control center 4. The communication bridge 7 may also be connected to a printer 8 to enable local printing of temperature information and reports on the heat-treatment operation.

Users may view real-time and historical data on heat-treatment operations via a web application on any Internet-connected electronic device 11. The web application may also provide or facilitate centralized project management and reporting. A user, such as a site manager, can use an Internet-connected electronic device 11, such as a smartphone or laptop, to view and download real-time and historical data, along with reports and other related quality control documentation, stored by the control center 4. The web application may also provide notifications and information, via push notifications and messaging, to personnel, including staff at the control center 4, field personnel at work sites, work site managers, customers, or others depending on the nature of the alarm condition. For example, status updates on the heat-treatment operation or required paperwork may be transmitted via the web application to a site manager's Internet-connected electronic device 11.

The control center 4 is an operational monitoring and control facility that may be located anywhere in the world and communicates with communication bridges 7 at each work site to remotely monitor and control any number of heat-treatment operations. The control center 4 includes a plurality of computer systems programmed to automatically collect data on heat-treatment operations from communication bridges 7, located at remote work sites. The data includes temperature data, which the control center 4 automatically compares, in real time, against temperature profile and alarm parameters for the particular heat-treatment operation being performed at the work site. If the control center 4 detects a deviation outside the alarm parameters, an alarm is generated at the control center 4 and designated personnel are notified.

The computer systems at the control center 4 are programmed with sets of instructions and procedures to attempt to rectify any alarm condition automatically, by communicating with the on-site equipment and providing instructions via the communication bridge 7. The instructions may include shutdown instructions, for example, in the event of an over-temperature condition; alarm and hold, for example, in the event of an over/under temperature condition; ramp up and cooling rates to a specified temperature; and soak dwell time at a specified temperature.

The control center 4 receives, verifies, and stores all of the data it receives from the communication bridges 7. In the event of a communication interruption with any communication bridge 7, upon re-establishing communication, the control center 4 automatically retrieves the data for the time that communication was interrupted to synchronize the data between the control center 4 and the communication bridge 7.

The control center 4 also stores and tracks the documentation requirements for each type of heat-treatment operation and automatically produces reports and other documents, in compliance with the applicable safety and quality assurance standards. The control center 4 may also store forms provided by a particular user and automatically prepare any documents required by the user's own quality programs. Examples of documents automatically produced by the control center 4 include: Heat cycle authorization for weld specification ranges forms, customer support documents, secure data reports, Brinell hardness reports, certificates of calibration, and work acceptance forms.

In order to maintain continuity of heat-treatment operations in the event of communication interruptions between the control center 4 and the communication bridge 7, or between any of the heat-treatment units 6 and the communication bridge 7, each heat-treatment unit 6 is programmed with all of the instructions and parameters necessary to complete its part of the heat-treatment operation at the work site.

In one example, the method of remote control and monitoring of a heat-treatment operation at a work site begins by establishing a secure wireless network at the work site. The wireless network has sufficient signal strength and range to cover the entire work site. A communication bridge 7 and one or more heat-treatment units 6 are installed at the work site and operate on a secure wireless network with a range of approximately 3 miles in radius, without a line-of-sight requirement between the communication bridge 7 and the heat-treatment units 6 at the work site.

Next, all of the necessary heating elements 3, thermocouples, and DAC units 1 are installed at/on each of the workpieces 2. All of these components are then connected with one or more nearby heat-treatment units 6, via secondary cables 9 and splitters 10. Once the on-site hardware installation is complete, the system is turned on and the heat-treatment units 6 then connect with the local communication bridge 7, which, in turn, connects with the control center 4. By default, the system starts up in a lockout mode to prevent any accidental injuries. The necessary instructions and parameters, including temperature profiles and alarm parameters, for each heat-treatment unit 6 are transmitted from the control center 4, via the communication bridge 7. Once the instructions, profiles, and parameters are installed on each of the on-site heat-treatment units 6, the heat-treatment operation may be initiated by field personnel engaging a chip card 5 with the DAC units 1 to release the lockout. The information and signal from the DAC unit 1 to release the lockout is transmitted to the control center 4, which verifies the information before selecting the corresponding heat-treatment unit 6 to initiate the heat-treatment operation on the workpiece 2 associated with that DAC unit 1. This process repeats as the field personnel release the lockout on each workpiece 2. Thereafter, the heat-treatment operation is continuously monitored and controlled by the control center 4, and by the local heat-treatment units 6 in case of a communication interruption. In the event a chip card 5 is engaged with the card reader on a DAC unit 1 after the heat-treatment operation is complete, the heat-treatment unit 6 and control center 4 compare the historical data on the heat-treatment operation with the specified parameters for the particular workpiece 2 with which that DAC unit 1 is associated and recognize that the parameters of the particular heat-treatment operation are complete and no action is taken.

In particular, during the heat-treatment operation, the heat-treatment units 6 receive, store, and process data, including temperature data from the thermocouples, via the DAC units 1, and transmit the data, via the communication bridge 7 to the control center 4. The control center 4 receives, stores, and processes the data from the heat-treatment units 6 located at the work site. Both the heat-treatment units 6 and the control center 4 monitor the data and compare it in real time to temperature profiles and alarm parameters, specific to the particular heat-treatment operation, being conducted at the work site. If either a heat-treatment unit 6 or the control center 4 detect an alarm condition, they automatically take a prescribed action, depending on the alarm condition detected, including sending alerts and instructions to field personnel, and pausing the heat-treatment operation.

Figure 2:
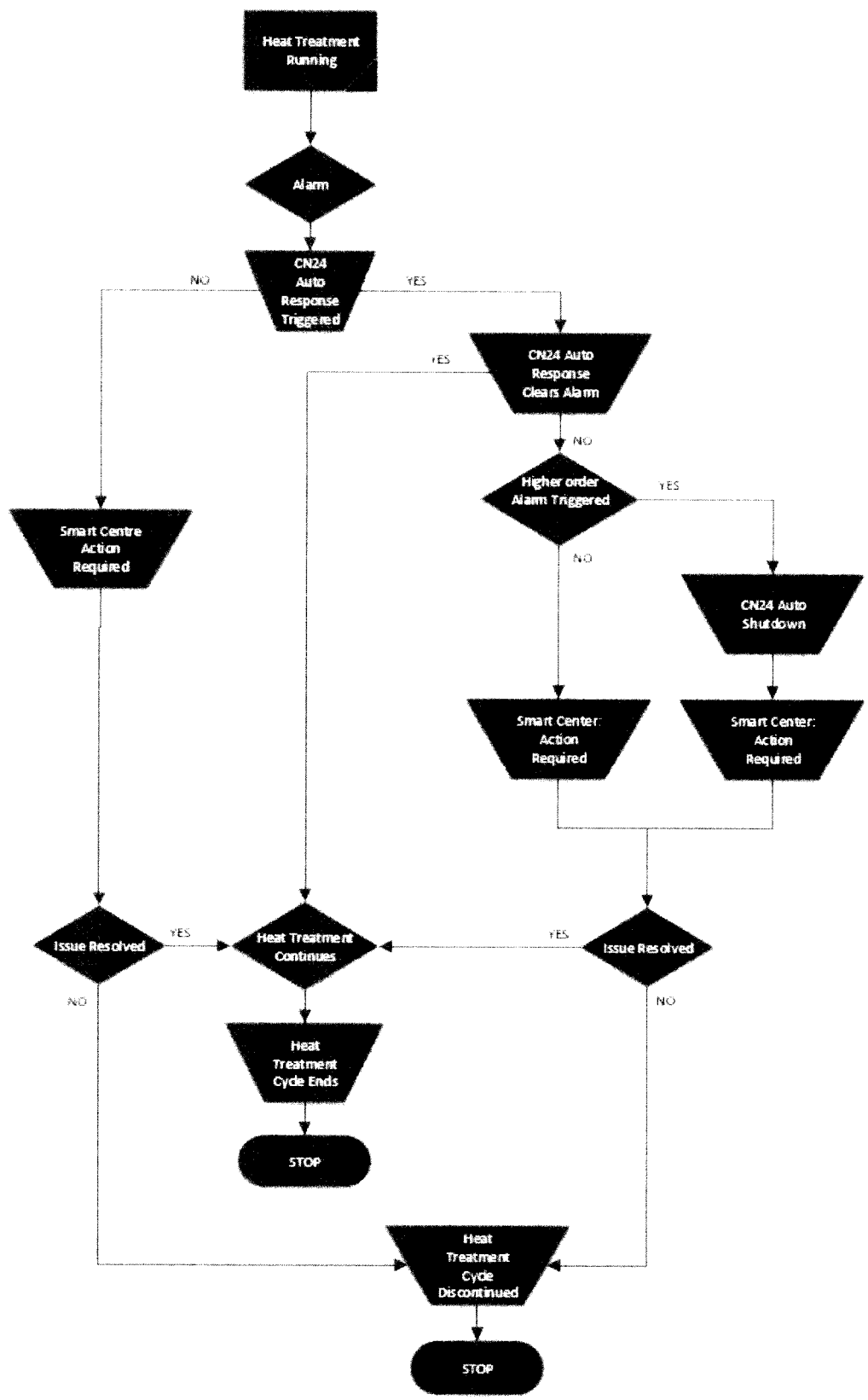
FIG. 2 is a flow chart, showing the handling of an alarm condition, according to the method of the present invention.

For example, as shown in FIG. 2, if an alarm condition is detected during the heat-treatment operation, this triggers an automatic response by the heat-treatment unit 6, depending on the type of alarm condition and the specifications of the heat-treatment operation. Certain alarm conditions may not trigger an automatic response from the heat-treatment unit 6, in which case a signal is sent to the control center 4 that action is required to respond to the alarm condition. If the control center 4 is able to resolve the issue that caused the alarm condition, the heat-treatment operation continues, otherwise it may require the heat-treatment operation to be discontinued. If an automatic response is triggered by the heat-treatment unit 6 and the automatic response clears the alarm condition, the heat-treatment operation continues. If it does not clear the alarm condition, the heat-treatment unit 6 signals the control center 4 that action is required to resolve the alarm condition. In certain circumstances, a higher order alarm condition may be triggered, which may cause the heat-treatment unit 6 to shut down and signal the control center 4 that action is required to respond to the higher order alarm condition. If the control center 4 is able to resolve the issue that caused the alarm condition or the higher order alarm condition, the heat-treatment operation continues, or resumes and continues, if not, the heat-treatment operation may be discontinued.

Figure 3:
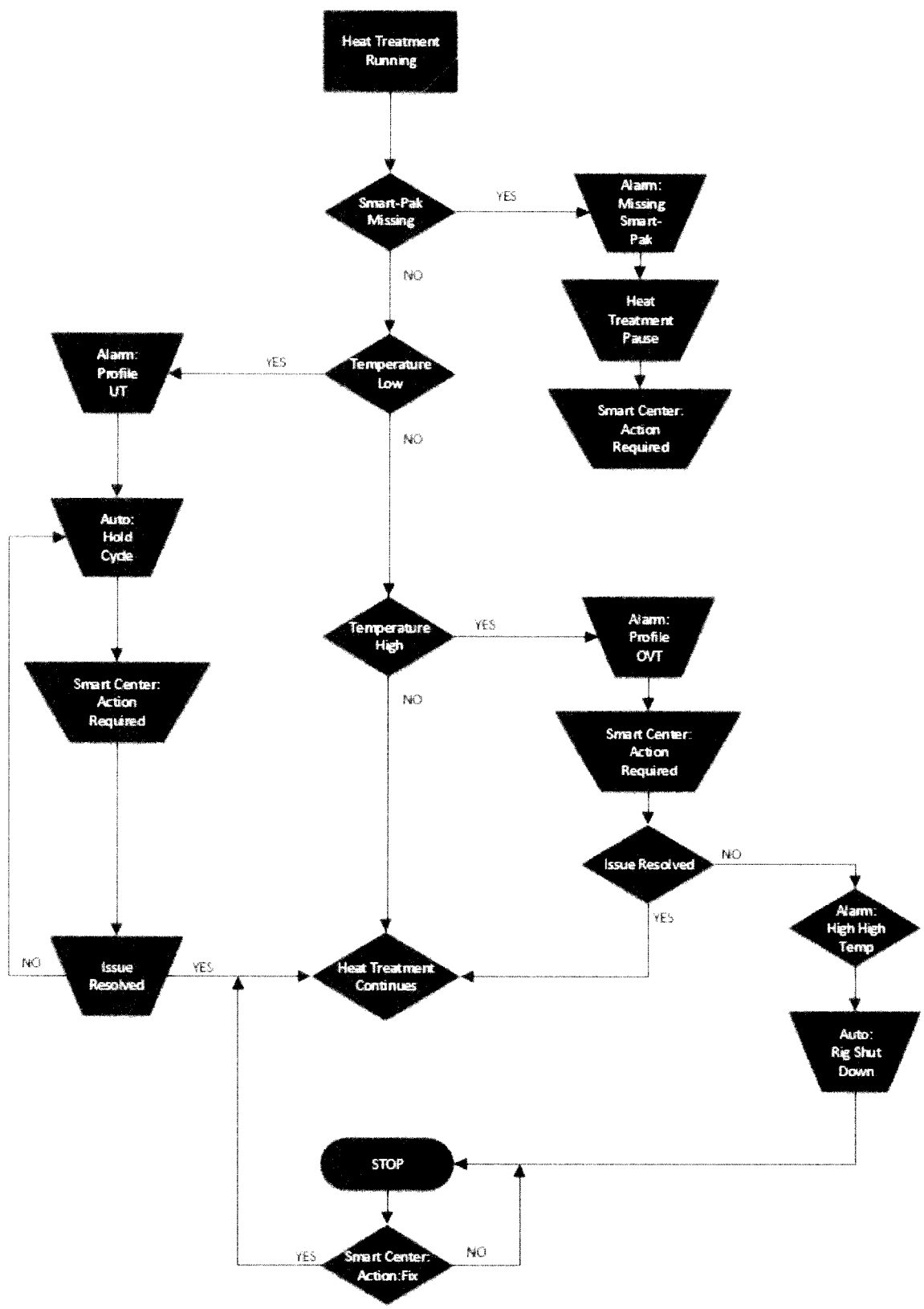
FIG. 3 is a flow chart, showing the handling of example alarm conditions.

As shown in FIG. 3, the alarm conditions may include a signal that the DAC unit 1 is missing or not operational. If this alarm condition is detected, the heat-treatment unit 6 pauses the heat-treatment operation and sends a signal to the control center 4 that action is required. Another exemplary alarm condition is a low-temperature alarm condition. If the temperature data sent from the DAC unit 1 to the heat-treatment unit 6 is below the minimum specified temperature for the particular heat-treatment operation, this triggers a low-temperature alarm condition. The heat-treatment unit 6 automatically initiates a hold on the heat-treatment operation and sends a signal to the control center 4 that action is required to resolve the alarm condition. Another exemplary alarm condition is a high-temperature alarm condition. If the temperature data sent from the DAC unit 1 to the heat-treatment unit 6 is above the maximum specified temperature for the particular heat-treatment operation, this triggers a high-temperature alarm condition. The heat-treatment unit 6 sends a signal to the control center 4 that action is required to resolve the alarm condition. If the control center 4 is unable to resolve the alarm condition, it may trigger an automatic shutdown of the heat-treatment operation.

Figure 4:
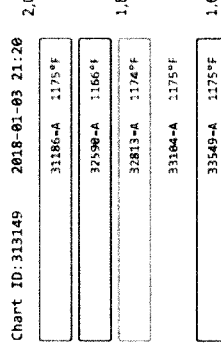
FIG. 4 is a temperature chart, showing temperature data for an example heat-treatment operation.

Additionally, at any time during the heat-treatment operation, a user, such as a work site manager, may use an electronic device 11, such as a smartphone to view and download real time and historical data on the heat-treatment operation via the web application. For example, as shown in FIG. 4, a user may view and download a chart showing historical temperature data for a particular set of heat-treatment operations.

Upon completion of the heat-treatment operation, the control center 4 prepares all of the necessary documents, such as secure data reports, Brinell hardness reports, and work acceptance forms, required by the applicable safety and quality assurance standards.

The present invention has been described and illustrated with reference to an exemplary embodiment, however, it will be understood by those skilled in the art that various changes may be made and equivalents may be substituted for elements thereof without departing from the scope of the invention as set out in the following claims. Therefore, it is intended that the invention not be limited to the particular embodiments disclosed herein.

What is claimed is:

1. A method of remote control and monitoring of heat-treatment equipment, comprising heating elements installed on a workpiece at a work site to perform a heat-treatment operation, the method comprising the steps of: installing a communication bridge and a heat-treatment unit at the work site and connecting the communication bridge and heat-treatment unit via a local communication network at the work site; connecting the heating elements with the heat-treatment unit; installing one or more data acquisition and control units adjacent the workpiece, each having a plurality of thermocouples attached to the workpiece for monitoring the temperature of the workpiece; connecting the one or more data acquisition and the control units with the heat-treatment unit to transmit the temperature of the workpiece to the heat-treatment unit; connecting the communication bridge with a control center via a second communication network; transmitting instructions and parameters specific to the heat-treatment operation from the control center to the heat-treatment unit, via the communication bridge; transmitting the temperature of the workpiece from the one or more data acquisition and the control units to the heat-treatment unit and the control center; receiving, storing, and processing the temperature of the workpiece by the heat-treatment unit and the control center; and controlling the heating elements by the heat-treatment unit according to the instructions to maintain the temperature of the workpiece.

2. The method of claim 1, further comprising the steps of:
starting up the heat-treatment equipment in a lockout mode;
receiving a first signal at the one or more data acquisition and the control units to release the lockout and transmitting the first signal to the control center; and
transmitting a second signal from the control center to the heat-treatment unit to begin the heat-treatment operation.

3. The method of claim 1, further comprising the steps of:
comparing a first temperature of the workpiece to the parameters;
detecting whether the first temperature is outside the parameters and, if so, generating an alarm.

4. The method of claim 3, further comprising the step of controlling the heating elements by the heat-treatment unit according to the instructions to rectify an alarm.

5. A remote control and monitoring apparatus for heat-treatment equipment having heating elements installed on a workpiece at a work site to perform a heat-treatment operation, the remote control and monitoring apparatus comprising one or more data acquisition and control units, a heat-treatment unit, a communication bridge, and a control center,
wherein each of the one or more data acquisition and control units has a plurality of thermocouples attached to the workpiece to monitor the temperature of the workpiece and is in communication with the heat-treatment unit,
wherein the heat-treatment unit has a power supply and a computer processor, configured with instructions and parameters specific to the heat-treatment operation, and receives, stores, and processes the temperature of the workpiece from the one or more data acquisition and control units and controls the power to the heating elements according to the instructions in order to maintain the temperature of the workpiece within the parameters,
wherein the communication bridge is in communication with the heat-treatment unit and the control center, and
wherein the control center has a computer processor configured with the instructions and parameters and receives, stores, and processes the temperature of the workpiece.

6. The remote control and monitoring apparatus of claim 5, wherein the communication bridge has a computer processor and receives, stores, and processes the temperature of the workpiece.

7. The remote control and monitoring apparatus of claim 5, wherein at least one of the one or more data acquisition and control units has a card-reader system for reading a card used by field personnel.

8. The remote control and monitoring apparatus of claim 7, wherein the card-reader system is a radio frequency identification card-reader system and the card is a chip card with a radio frequency identification tag.

9. The remote control and monitoring apparatus of claim 7, wherein engaging or releasing a lockout of at least a portion of the heat-treatment equipment is performed by the field personnel by engaging the card with the card-reader system.

* * * * *